US012694626B2

(12) United States Patent
Li et al.

(10) Patent No.: US 12,694,626 B2
(45) Date of Patent: Jul. 28, 2026

(54) METHOD AND APPARATUS FOR DETERMINING SECURITY AREA, DEVICE, AND STORAGE MEDIUM

(71) Applicant: BEIJING ZITIAO NETWORK TECHNOLOGY CO., LTD., Beijing (CN)

(72) Inventors: Lei Li, Beijing (CN); Xinyu Cui, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 239 days.

(21) Appl. No.: 18/351,067

(22) Filed: Jul. 12, 2023

(65) Prior Publication Data

US 2024/0020930 A1 Jan. 18, 2024

(30) Foreign Application Priority Data

Jul. 13, 2022 (CN) .......................... 202210826961.2

(51) Int. Cl.
*G06T 19/00* (2011.01)
*G06T 5/50* (2006.01)
(Continued)

(52) U.S. Cl.
CPC .............. *G06T 19/006* (2013.01); *G06T 5/50* (2013.01); *G06T 7/50* (2017.01); *G06T 7/70* (2017.01);
(Continued)

(58) Field of Classification Search
CPC ........... G06T 19/006; G06T 5/50; G06T 7/50; G06T 7/70; G06T 2207/20221;
(Continued)

(56) References Cited

U.S. PATENT DOCUMENTS

2016/0253842 A1 9/2016 Shapira et al.
2018/0373412 A1 12/2018 Reif

FOREIGN PATENT DOCUMENTS

CN 103810353 A * 5/2014 ............. G06F 17/50
CN 109445596 A 3/2019
(Continued)

OTHER PUBLICATIONS

Cheng et al: VRoamer: Generating On-the fly VR experience while walking inside large, unknown Real World Building Environment {online} <URL:https://ieeeexplore.leee.org/document/8798074> (Year:2019).*

(Continued)

*Primary Examiner* — King Y Poon
(74) *Attorney, Agent, or Firm* — Alleman Hall LLP

(57) ABSTRACT

Provided are a method and apparatus for determining a security area, a device, and a storage medium. The method includes: determining property information of an entity in a real scene in which a user is in a motion; displaying, based on the property information of the entity, in a virtual space a target virtual scene mapped from the real scene; and determining, based on a security-type virtual object in the target virtual scene, a corresponding security area. In the present disclosure, the customized delineation of the security area in a plurality of spatial ranges is achieved by using the user's motion in the real scene, and an adaptability between the security area and the real scene is ensured. Moreover, by displaying the target virtual scene mapped from the real scene to the user, the user's collision-free motion in the real scene can be supported before the security area is delineated.

18 Claims, 7 Drawing Sheets

(51) Int. Cl.
  *G06T 7/50*          (2017.01)
  *G06T 7/70*          (2017.01)
  *G06V 10/20*         (2022.01)
(52) U.S. Cl.
  CPC .. *G06V 10/255* (2022.01); *G06T 2207/20221*
          (2013.01); *G06T 2207/30244* (2013.01)
(58) Field of Classification Search
  CPC ......... G06T 2207/30244; G06T 19/00; G06V
          10/255; G06V 20/20; G06V 20/36; G06F
                            3/011; G06F 2203/012
  See application file for complete search history.

(56)                  References Cited

FOREIGN PATENT DOCUMENTS

| CN | 111243103 | A |   | 6/2020 | |
|----|-----------|---|---|--------|--|
| CN | 111708432 | A | * | 9/2020 | ............ G06F 18/22 |
| CN | 113284258 | A |   | 8/2021 | |

OTHER PUBLICATIONS

China National Intellectual Property Administration, Office Action Issued in Application No. 202210826961.2, Dec. 19, 2024, 27 pages.
China National Intellectual Property Administration, Office Action and Search Report Issued in Application No. 202210826961.2, May 31, 2024, 22 pages.

* cited by examiner

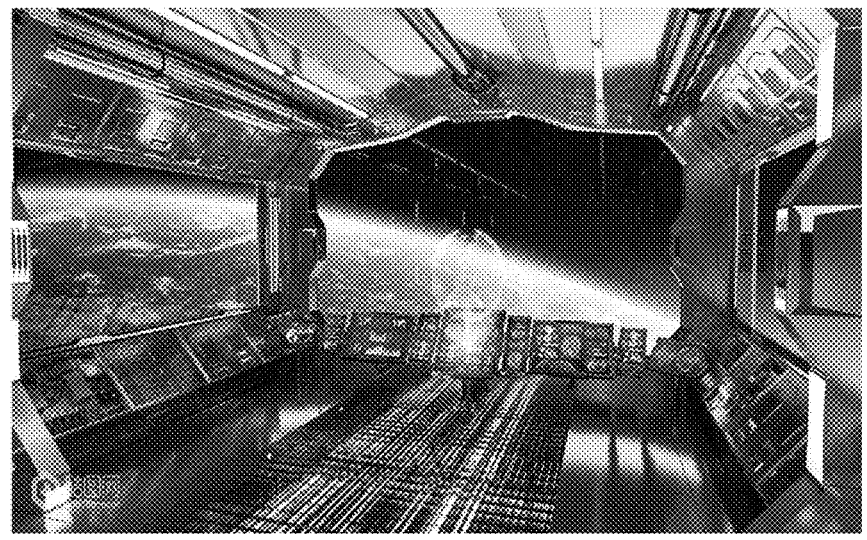

FIG. 8B

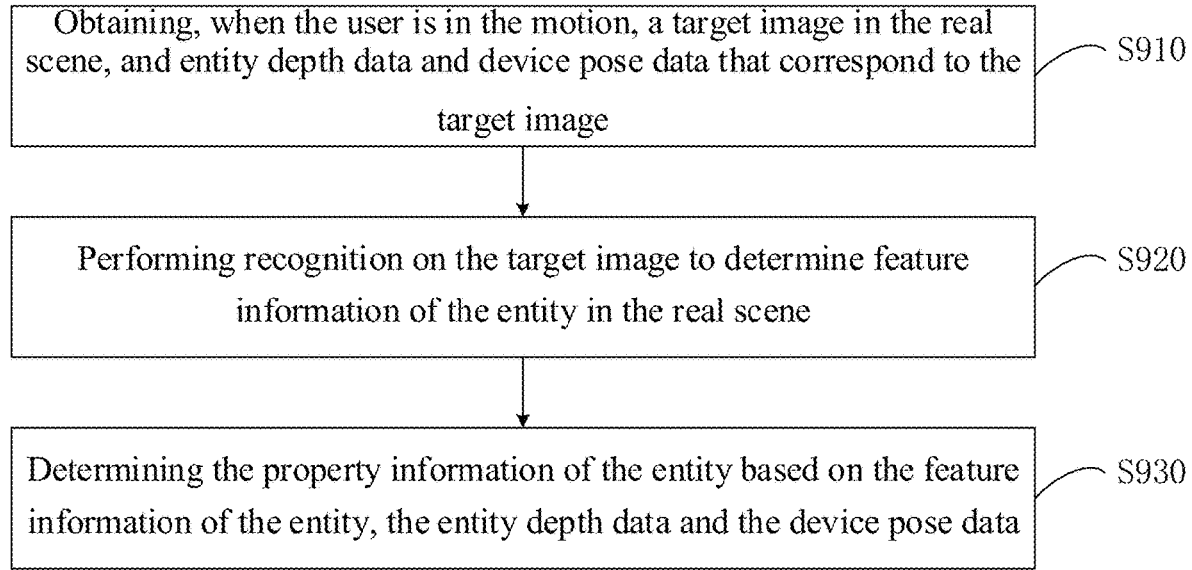

| |
|---|
| Obtaining, when the user is in the motion, a target image in the real scene, and entity depth data and device pose data that correspond to the target image |
| Performing recognition on the target image to determine feature information of the entity in the real scene |
| Determining the property information of the entity based on the feature information of the entity, the entity depth data and the device pose data |

METHOD AND APPARATUS FOR DETERMINING SECURITY AREA, DEVICE, AND STORAGE MEDIUM

CROSS-REFERENCE TO RELATED APPLICATION

This application is based on and claims priority to Chinese Patent Application No. 202210826961.2, filed on Jul. 13, 2022, the entire content of which is incorporated herein by reference.

FIELD

Embodiments of the present disclosure relates to the field of Extended Reality (XR) technologies, and in particular, to a method for determining a security area, an apparatus for determining a security area, a device, and a storage medium.

BACKGROUND

At present, XR technology is widely used in many application scenes, and specifically includes Virtual Reality (VR), Augmented Reality (AR), and Mixed Reality (MR), etc. After a user wearing an XR device enters the virtual interactive scene, the perception ability of the user for the real surrounding environment decreases, which may subject to a collision between the user and the real surrounding objects.

Usually, the XR device automatically delineates a fixed-shaped security area, such as a cylindrical space with a radius of 1 meter and a height of 2 meters, which does not ensure the adaptability between a security area and a real scene. Alternatively, the XR device presents the user with the real surrounding environment by means of a perspective function in order to allow the user to freely delineate the security area. However, when delineating the security area in a plurality of spatial ranges, it mainly relies on a joystick operation of a handle to simulate the user's jumping in the plurality of spatial ranges in order to avoid collisions, which tends to cause vertigo symptoms of the user and greatly reduces the immersion when delineating the security area.

Therefore, the above-mentioned method for determining the security area has certain limitations.

SUMMARY

The present disclosure provides a method for determining a security area, an apparatus for determining a security area, a device, and a storage medium, which achieves a customized delineation of a security area in a plurality of spatial scales by using a user's motion in a real scene, enhancing the immersion and the diverse interaction when determining the security area.

In a first aspect, a method for determining a security area is provided according to one embodiment of the present disclosure. The method is applied in an XR device. The method for determining the security area includes: determining property information of an entity in a real scene in which a user is in a motion; displaying, based on the property information of the entity, in a virtual space a target virtual scene mapped from the real scene; and determining, based on a security-type virtual object in the target virtual scene, a corresponding security area.

In a second aspect, an apparatus for determining a security area is provided according to one embodiment of the present disclosure. The apparatus is configured in an XR device. The apparatus for determining the security area includes: an entity property determining module configured to determine property information of an entity in a real scene in which a user is in a motion; a scene mapping module configured to display, based on the property information of the entity, in a virtual space a target virtual scene mapped from the real scene; and a security area determining module configured to determine, based on a security-type virtual object in the target virtual scene, a corresponding security area.

In a third aspect, an electronic device is provided according to one embodiment of the present disclosure. The electronic device includes: a processor; and a memory storing a computer program. The processor is configured to invoke and execute the computer program stored on the memory to perform the method for determining the security area described in the first aspect of the present disclosure.

In a fourth aspect, a computer readable storage medium is provided according to one embodiment of the present disclosure. The computer readable storage medium stores a computer program, the computer program causing a computer to perform the method for determining the security area described in the first aspect of the present disclosure.

In a fifth aspect, a computer program product is provided according to one embodiment of the present disclosure. The computer program product includes a computer program and/or instructions that cause a computer to perform the method for determining the security area described in the first aspect of the present disclosure.

With a technical solution of the present disclosure, after the user wears the XR device, the property information of each entity within the real scene in which the user is in the motion is first determined, and then the target virtual scene mapped from the real scene is displayed in the virtual space based on the property information of the each entity, and then the corresponding security area can be determined based on the security-type virtual object within the target virtual scene, thereby achieving the customized delineation of the security area in a plurality of spatial ranges by using the user's motion in the real scene, and ensuring an adaptability between the security area and the real scene. Moreover, by displaying the target virtual scene mapped from the real scene to the user, the user's collision-free motion in the real scene can be supported before the security area is delineated, thereby enhancing the immersion and the diverse interaction when the security area is determined.

BRIEF DESCRIPTION OF DRAWINGS

In order to more clearly illustrate the technical solutions of the embodiments of the present disclosure, the accompanying drawings which are required for the description of the embodiments will be briefly introduced below. It is obvious that the drawings in the description below are only some embodiments of the present disclosure, and other drawings may be obtained for a person skilled in the art based on these drawings without involving any inventive effort.

FIG. 8A and FIG. 8B are exemplary schematic diagrams of another real scene mapped into a target virtual scene according to an embodiment of the present disclosure;

FIG. 9 is a flowchart of a method for determining property information of each entity within a real scene according to an embodiment of the present disclosure;

DESCRIPTION OF EMBODIMENTS

Figure 1:
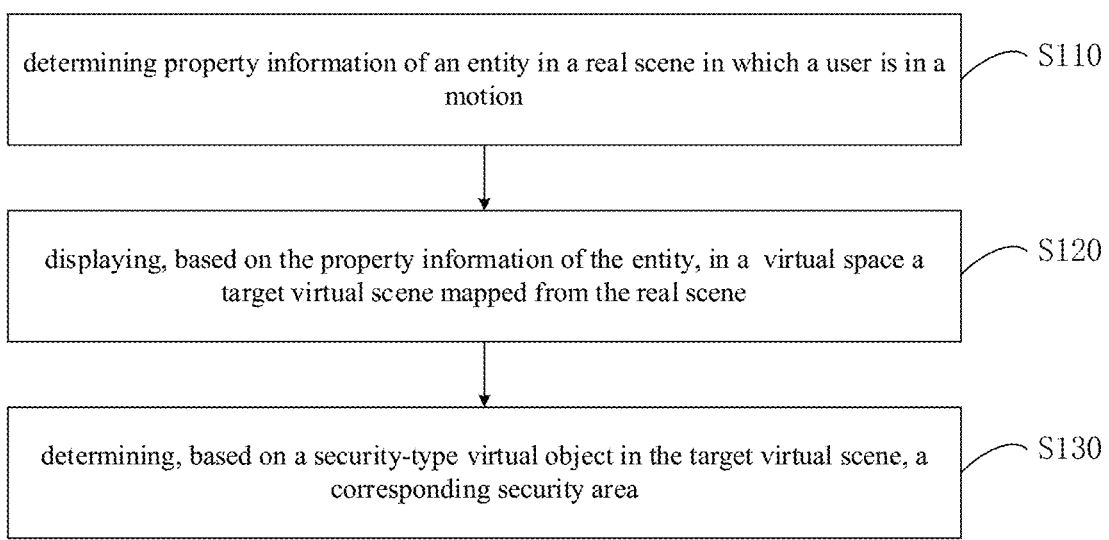
FIG. 1 is a flowchart of a method for determining a security area according to an embodiment of the present disclosure.

The technical solutions in embodiments of the present disclosure will be described clearly and completely in conjunction with the accompanying drawings in the embodiments of the present disclosure. Obviously, the described embodiments are only a part, rather than all of the embodiments of the present disclosure. Based on the embodiments of the present disclosure, all other embodiments obtained by a person of ordinary skill in the art without inventive effort fall within the scope of the present disclosure.

It is noted that the terms "first", "second", and the like in the description, claims, and the aforementioned figures, are used for distinguishing similar objects and not necessarily for describing a particular sequential or chronological order. It is to be understood that the terms used in this way are interchangeable under appropriate circumstances such that the embodiments of the present disclosure described herein can be implemented in sequences other than those illustrated or described herein. Furthermore, the terms "comprise", "include" and "have", as well as any variations thereof, are intended to cover a non-exclusive inclusion, such that a process, method, system, product, or server that includes a list of steps or units is not necessarily limited to those steps or units expressly listed, but may include other steps or units not expressly listed or inherent to such process, method, product, or device.

In the embodiments of the present disclosure, the words "exemplary" or "such as" are used to indicate an example, instance, or illustration, and any embodiment or scheme described as "exemplary" or "such as" in the embodiments of the present disclosure is not to be construed as preferred or advantageous over other embodiments or schemes. Rather, the use of the words "exemplary" or "such as" are intended to present related concepts in a specific manner.

In order to solve a limitation problem in the delineation of a security area in the related art, the present disclosure is conceived as follows: after a user wears an XR device, property information of each entity within a real scene in which the user is in a motion is first determined, and then a target virtual scene mapped from a real scene is displayed in a virtual space based on the property information of each entity, and then a corresponding security area can be determined based on a security-type virtual object within the target virtual scene, thereby achieving a customized delineation of the security area in a plurality of spatial ranges by using the user's motion in the real scene, and ensuring an adaptability between the security area and the real scene. Moreover, by displaying the target virtual scene mapped from the real scene to the user, the user's collision-free motion in the real scene can be supported before the security area is delineated, thereby enhancing the immersion and the diverse interaction when the security area is determined.

Prior to introducing a specific technical solution of the present disclosure, the XR device (which may include various virtual space products such as a VR, an AR and a MR) configured to provide the user with the virtual space to display interactive scene information is firstly described: the XR device is mainly configured to simulate various real environments and integrate corresponding virtual scene information, to provide the user with an immersive 3D virtual environment.

Exemplarily, the XR device in the present disclosure may include a Head Mounted Display (HMD) and a handle. The HMD and the handle may communicate with each other. The HMD is configured to provide the user with a virtual space for realizing various interactive scenarios, and the handle is configured to realize the operation of delineating the security area within the virtual space.

At this time, in order to ensure accurate virtualization mapping of the real scene, the property information of the entity within the real scene needs to be obtained accurately. Therefore, the XR device in the present disclosure will be configured with corresponding entity detection device, such as a front camera, a range sensor, an inertial sensor and a location tracker. During the user's motion, the property information of each entity in the real scene with different types will be collected in real time, so that the real scene during the user's motion can be continuously virtualized into a corresponding target virtual scene, to ensure the collision-free motion of the user in the real scene before the security area is delineated, and the customized delineation of the security area in a plurality of spatial ranges can be realized through the user's motion in the plurality of spatial ranges.

The technical solution of the present disclosure is described in detail:

FIG. 1 is a flowchart of a method for determining a security area according to an embodiment of the present disclosure. The method may be applied in, but is not limited to, the XR device. The method may be performed by an apparatus for determining a security area according to the present disclosure. The apparatus for determining the security may be implemented by means of any software and/or hardware. Exemplarily, the apparatus for determining the security may be configured in an electronic device, such as AR/VR/MR, capable of simulating a virtual scene, and the present disclosure does not impose any limitation on the specific type of the electronic device.

Specifically, as shown in FIG. 1, the method for determining the security area may include the following steps.

At block S110, property information of an entity in a real scene in which a user is in a motion is determined.

In the present disclosure, the real scene in which the user is in the motion may be various spatial ranges involved in the user's current delineation of the security area. One or more spatial ranges may be provided within the real scene, and the size of any spatial range is not limited, in order to support the customized delineation of the security area in the spatial range with any size.

Then, after the user wears the XR device, the XR device may use the various configured entity detection devices, such as the front camera, the range sensor, the inertial sensor and the location tracker, etc., to collect the various scene feature information in the real scene in real time during the motion in the various spatial ranges within the real scene, so as to subsequently simulate the corresponding virtual scene.

Moreover, the entity in the present disclosure may be actual existing objects in the real scene, that is, the smallest object unit in any space that cannot be divided, and may include three types of composition: a point, a line and a surface.

Figure 2:
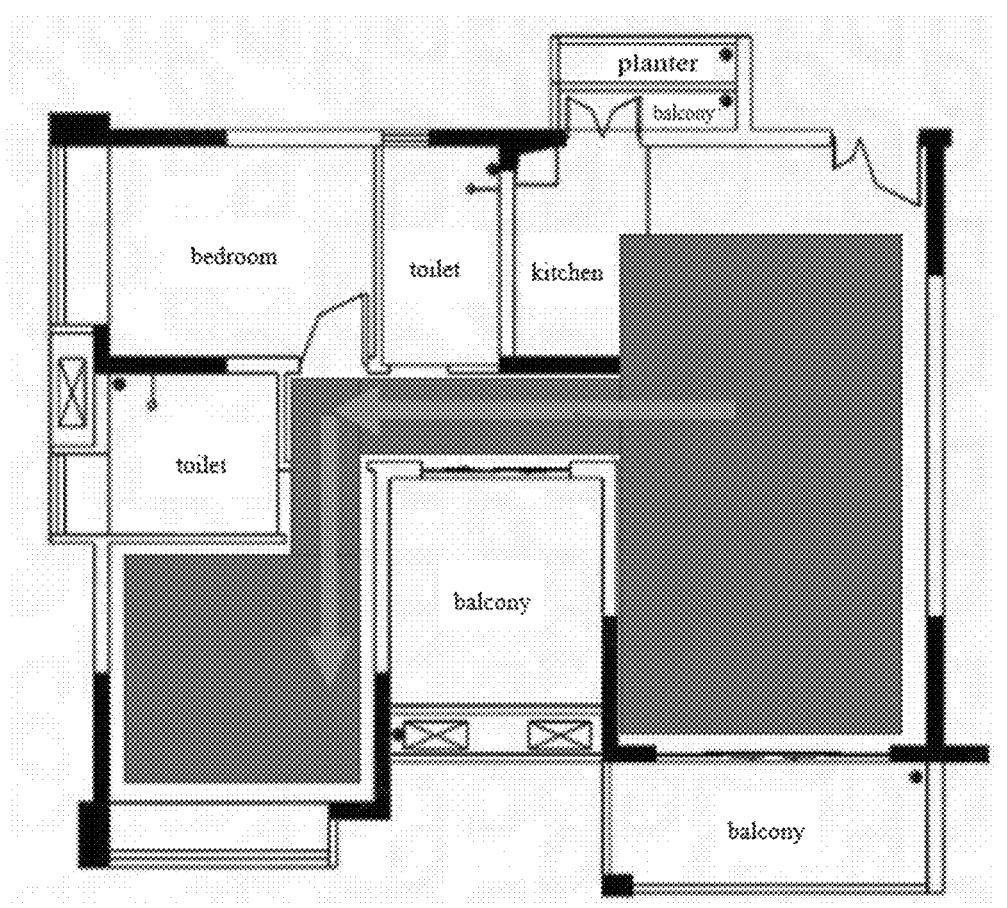
FIG. 2 is a schematic diagram of a real scene according to an embodiment of the present disclosure.

Taking the user's home scene as an example, as shown in FIG. 2, the real scene in the present disclosure may include various spaces such as a living room, an activity room, etc. An arrow in FIG. 2 may indicate a motion route of the user in the real scene. The entity within the real scene may include various real objects such as a wall, a corridor, a floor, a sofa, a window, a table, a chair, etc. within any space.

It should be understood that the entity in the present disclosure may include an obstacle entity and a security entity. The obstacle entity is an entity that may collide with the user and affect a normal motion of the user, such as the wall, the sofa, the window, the table, the chair, etc. The security entity is an entity that doesn't collide with the user and supports a safe motion of the user, such as the corridor, the floor, etc.

According to one or more embodiments of the present disclosure, during the motion of the user within the real scene, the XR device collects various scene feature information within the real scene in which the XR device is located in real time. Then, by integrating and analyzing the various scene feature information, the XR device can identify each entity existing in the real scene, as well as various types of property information of each entity in the current motion of the user.

The property information of each entity may be used to describe a spatial characteristic of the entity within the real scene from different perspectives.

In some implementable manners, the property information of each entity in the present disclosure may include at least feature information, relative position information and absolute position information of the entity, etc.

The property information of the entity may be a specific description of an entity's shape, such as a size, a structure, a shape characteristic, and the like of the entity.

The relative position information of the entity may be distance information between the entity and the user during the user's motion. The present disclosure may use position coordinates in a user coordinate system constructed by taking any motion position of the user in the real scene as an origin, to represent the relative position information of the entity.

The absolute position information of the entity may be the actual position of the entity within the real scene. The present disclosure may use position coordinates in a world coordinate system, to represent the absolute position information of the entity.

In addition, in order to ensure accurate triggering of the delineation of the security area and avoid misconfiguration of the security area, the XR device in the present disclosure is needed to first controlled to enter the security area configuration state, so that the XR device performs steps of determining the security area only in the security area configuration state, and does not perform the steps of determining the security area in other states.

Thus, prior to determining the property information of each entity within the real scene in which the user is in the motion, the following steps are further performed in the present disclosure: entering the virtual space; and displaying, in response to a wake-up instruction in the virtual space, a configuration entry of the security area in the virtual space, to perform a configuration operation of the security area.

That is, after the user wears the XR device, the XR device is made to be in an operating state by turning on the XR device. Then, the XR device displays the user with an initialized virtual scene in a variety of types, to enter a corresponding virtual space. At this point, the initialized virtual scene may be any VR game scene, etc.

Then, whether the security area is currently required to be configured is determined by determining whether an input signal of the handle or an operation gesture of the user is detected. If the input signal of the handle or the operation gesture of the user is detected, a corresponding wake-up instruction is generated. And then, in response to the wake-up instruction, the configuration entry of the security area is displayed in the virtual space, to prompt the user to configure the security area in advance. In response to the user's trigger operation on the configuration entry, the XR device is controlled to enter the security area configuration state, to perform the operation of determining the security area according to the present disclosure.

At block S120, the target virtual scene mapped from the real scene is displayed in the virtual space based on the property information of the entity.

After determining the property information of each entity in the real scene, a shape style and position information of each entity in the real scene can be determined by analyzing the property information of each entity. Then, according to the shape style and the position information of each entity in the real scene, each entity can be virtualized into a virtual object at different locations, and thus the real scene can be mapped into a corresponding target virtual scene. The target virtual scene is composed of virtual objects virtualized by various entities in the real scene.

Further, in order to ensure collision-free motion of the user wearing the XR device in the real scene, the target virtual scene mapped from the real scene is displayed in the virtual space provided by the XR device according to the present disclosure. When the XR device is configured to delineate the security area, the target virtual scene is displayed to the user instead of the real scene displayed by a perspective function of the XR device, supporting the user to perform a real collision-free motion according to the target virtual space without relying on the joystick operation of the handle to realize collision-free motion, thereby enhancing the immersion and the diverse interaction when the security area is determined, and avoiding the user from experiencing a dizziness, and enhancing a sensory comfort when determining the security area.

It should be noted that after the user wears the XR device, the target virtual scene mapped from the real scene will be displayed to the user. At this time, because the property information of each entity in the real scene will change in the user's point of view in real time during the motion of the user, the specific scene picture of the target virtual scene in the virtual space will also change in accordance with the real scene picture in the user's point of view.

At block S130, a corresponding security area is determined based on the security-type virtual object in the target virtual scene.

It should be understood that since the entity within the real scene includes the obstacle entity and the security entity, the virtual object virtualized by each entity within the target virtual scene mapped from the real scene will also include an obstacle-type virtual object and the security-type virtual object.

The obstacle-type virtual object is obtained by virtualizing the obstacle entity in the real scene. Moreover, the obstacle-type virtual object has a warning meaning of obstacle for the collision-free motion of the user in the real scene, so that it can ensure the collision-free motion of the user in the real scene by avoiding the obstacle-type virtual object in the target virtual scene during the user's motion.

The security-type virtual object is obtained by virtualizing the security entity in the real scene. Moreover, the security-type virtual object has an indication meaning of the security area for the collision-free motion of the user in the real scene, to indicate that the user can perform a normal motion within a range where the security-type virtual object is located within the target virtual scene.

In the present disclosure, after displaying the target virtual scene mapped from the real scene in the virtual space, a security boundary indicated by the security-type virtual object can be determined by analyzing an intersection line between the security-type virtual object and other obstacle-type virtual object within the target virtual scene. Further, according to the security boundary indicated by the security-type virtual object, the corresponding security area can be determined in the real scene, to ensure an adaptability between the security area and the real scene.

Figure 3:
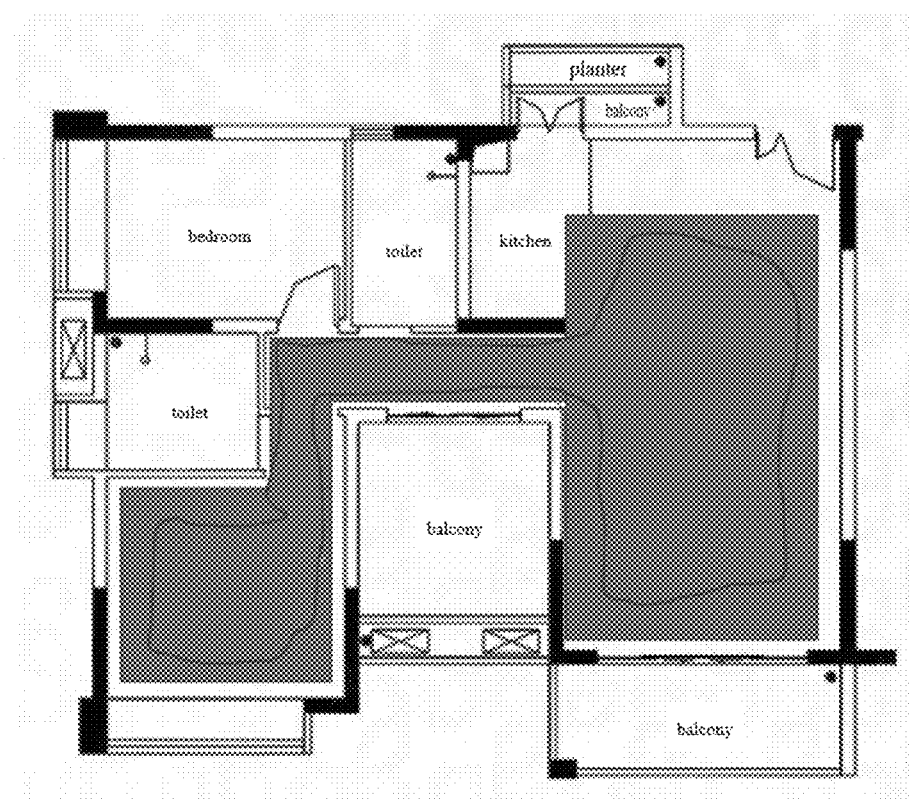
FIG. 3 is a schematic diagram of a security area determined within a real scene according to an embodiment of the present disclosure.

Taking the user's home scene as an example, after completing the motion in the real scene in accordance with a motion route indicated by the arrow in FIG. 2, an irregular area in FIG. 3 can be determined in the real scene as the corresponding security area, thus achieving the customized delineation of the security area in the plurality of spatial ranges in the real scene.

In the technical solution provided by the embodiment of the present disclosure, after the user wears the XR device, the property information of each entity within the real scene in which the user is in the motion is first determined, and then the target virtual scene mapped from the real scene is displayed in the virtual space based on the property information of the each entity, and then the corresponding security area can be determined based on the security-type virtual object within the target virtual scene, thereby achieving the customized delineation of the security area in a plurality of spatial ranges by using the user's motion in the real scene, and ensuring an adaptability between the security area and the real scene. Moreover, by displaying the target virtual scene mapped from the real scene to the user, the user's collision-free motion in the real scene can be supported before the security area is delineated, thereby enhancing the immersion and the diverse interaction when the security area is determined.

Figure 4:
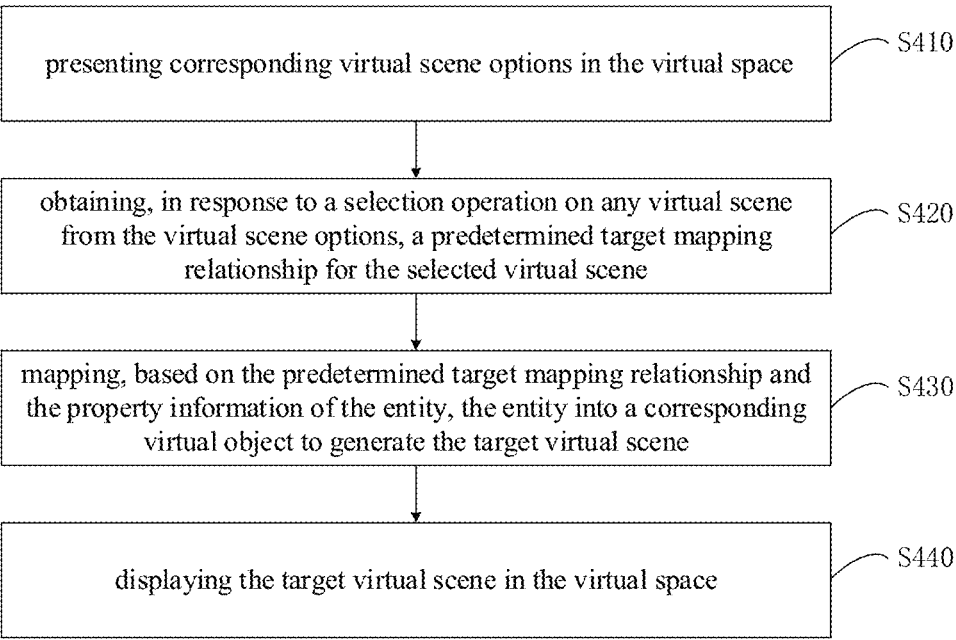
FIG. 4 is a flowchart of a method for displaying a target virtual scene mapped from a real scene within a virtual space according to an embodiment of the present disclosure.

As can be seen from the above, the real scene in which the user is located can be mapped into the target virtual scene with the security boundary having the indication meaning in the present disclosure, to ensure the collision-free motion of the user within the real scene. Moreover, in a determination stage of the security area, the real scene is mapped into the target virtual scene and displayed in the virtual space, which not only ensures the collision-free motion of the user within the real scene, but also can further enhance the immersion and the diverse interaction when the security area is determined. As shown in FIG. 4, the specific process of displaying the target virtual scene mapped from the real scene in the virtual space is illustrated in the present disclosure.

As shown in FIG. 4, the method of displaying the target virtual scene mapped from a real scene within the virtual space may specifically include the following steps.

At block S410, corresponding virtual scene options are presented in the virtual space.

In order to ensure the diverse interaction when the security area is determined, a plurality of types of virtual scenes and the mapping relationships applicable in each type of virtual scenes will be predetermined in the present disclosure.

When the XR device is in the security area configuration state, the corresponding virtual scene options are first presented in the virtual space to show the user the plurality of types of virtual scenes, thereby prompting the user to select a specific virtual scene among the plurality of types of virtual scenes, to achieve virtualized mapping of the real scenes and ensure the diverse interaction when the security area is determined.

At block S420, a predetermined target mapping relationship for the selected virtual scene is obtained in response to a selection operation on any virtual scene from the virtual scene options.

For the virtual scene options presented in the virtual space, the user may use the cursor ray of the handle to point to a specific virtual scene in the virtual scene options. Then, based on an input signal of a control on the handle or the user's gesture information, the user's selection operation on any virtual scene from the virtual scene options is detected. At this moment, in response to the selection operation on any virtual scene from the virtual scene options, the predetermined target mapping relationship for the selected virtual scene can be directly obtained.

The mapping relationship determined for any virtual scene can be various entity rules that are used to classify entities in the real scene, such as a height rule, a proximity rule, a width rule, etc. Moreover, in the mapping relationship, each entity after classification is set to be mapped to a certain virtual object after each entity is categorized when the real scene is mapped into a virtual scene.

Take the user's home scene as an example, if the selected virtual scene is a nature scene, and the mapping relationship is set according to the height rule. Then, a predetermined target mapping relationship of the selected virtual scene can be shown in Table 1 below:

TABLE 1

| Target mapping relationship in nature scenes | | | | |
|---|---|---|---|---|
| height rule | relative/absolute | height threshold | relative distance | nature scene |
| | absolute height | <0.5 m | <0.5 m | flower, shrub, rock |
| | | | >0.5 m | tree |
| | | >0.5 m | <0.5 m | tree |
| | | | >0.5 m | mountain |
| | relative height | <0.5 m | <0.5 m | flower, shrub, stone |
| | | | >0.5 m | tree, gazebo on the hill |
| | | >0.5 m | <0.5 m | tree |
| | | | >0.5 m | mountain |

At block S430, based on the predetermined target mapping relationship and the property information of the entity, the entity is mapped into a corresponding virtual object to generate the target virtual scene.

After the target mapping relationship is determined, the property information of each entity in the real scene is analyzed to determine that each entity satisfies which mapping condition in the target mapping relationship. Then, each entity may be mapped into a certain virtual object, such as the trees, hills with different distances and heights, specified by a mapping condition that the entity satisfies. And then, the real scene is mapped into the corresponding target virtual scene.

Figure 5:
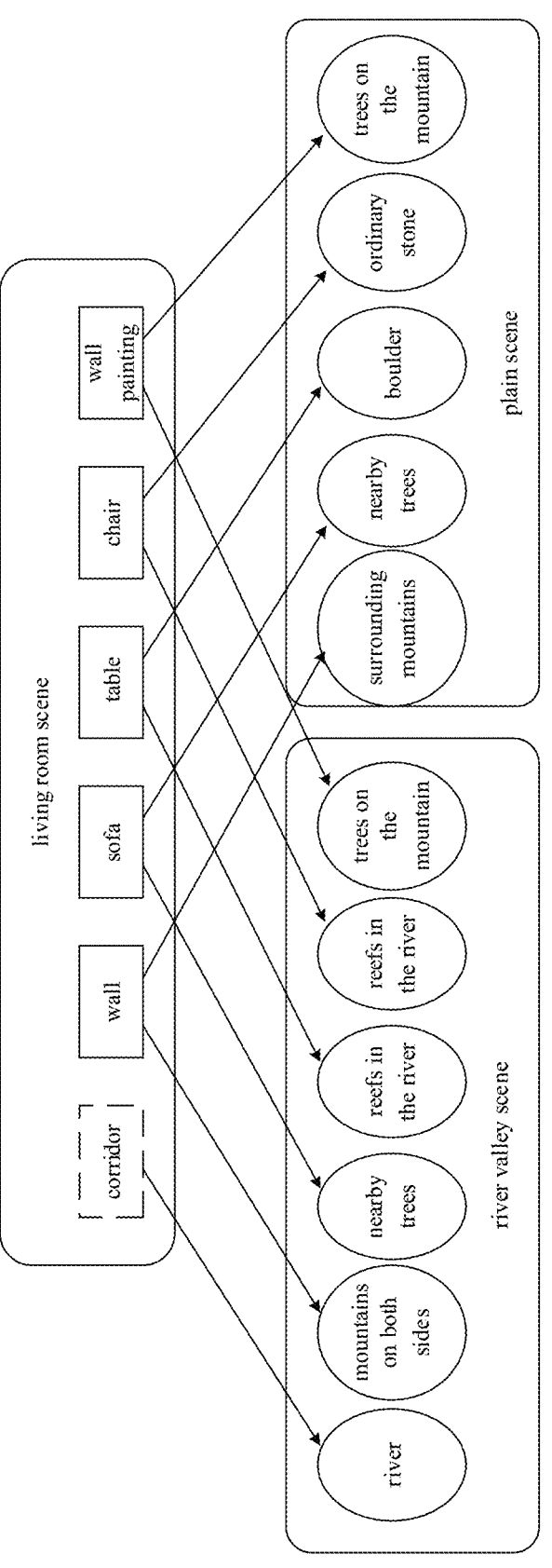
FIG. 5 is a mapping schematic diagram of a virtual object mapped from an entity within the real scene according to an embodiment of the present disclosure.

Take the living room in the user's home scene as an example, as shown in FIG. 5, the living room may generally include the wall, the sofa, the table, the chair, a wall painting, etc. The living room may be mapped into a certain nature scene. Moreover, for whether the living room has the corridor, the living room can be further distinguished to be mapped into a river valley scene or a plain scene in the nature scenes.

In the river valley scene, the wall in the living room may be mapped into the mountains on both sides, the sofa may be mapped into the nearby trees, the table and chair may be mapped into reefs in the river, the wall painting may be mapped into the trees on the mountain, and the corridor may be mapped into the river.

In the plain scene, the wall in the living room may be mapped into surrounding mountains, the sofa may be mapped into the nearby trees, the table may be mapped into a boulder, the chair may be mapped into an ordinary stone, and the wall painting may be mapped into the trees on the mountain.

Figure 6A:
FIG. 6A and FIG. 6B are exemplary schematic diagrams of a real scene mapped to a target virtual scene according to an embodiment of the present disclosure.
Figure 6B:
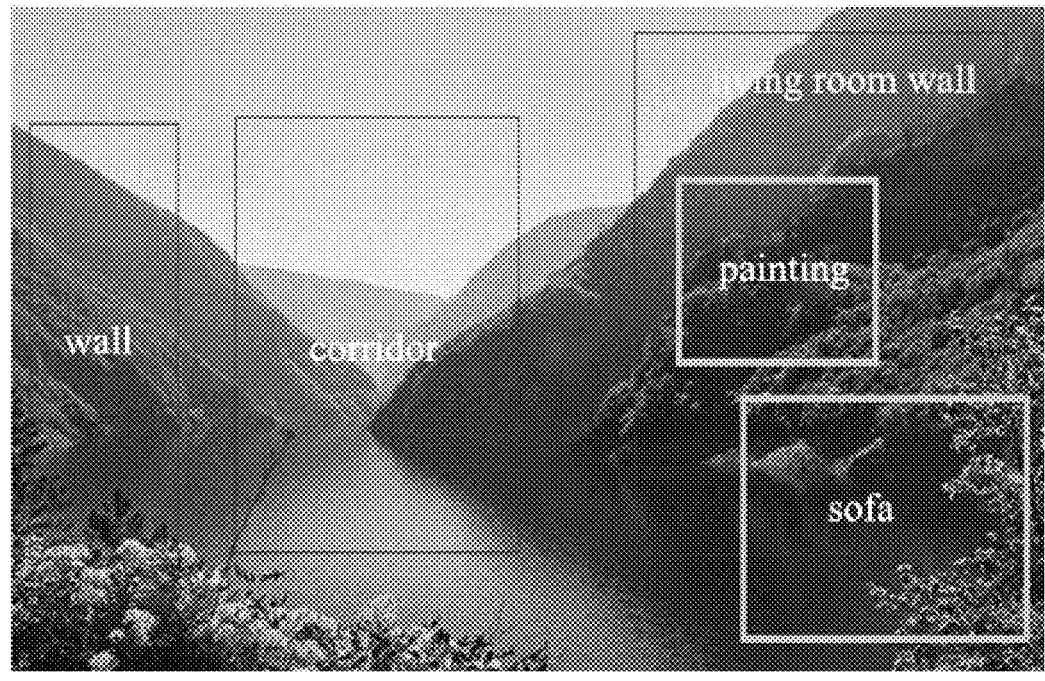

Take the user's home scene where the living room has the corridor as an example, as shown in FIG. 6A and FIG. 6B, the living room (with a corridor) may be mapped into a river valley (the river, the mountain, the tree). If the real scene where the user delineates the security area includes more than one room, then in addition to the living room scene, another room at the end of the corridor in the living room may be included. In an actual game process of the determination of the security area, the user may move forward along the river (that is, the corridor in the real scene), and in the process of moving forward, the virtual mountains and trees will change in the distance and size with changes of the wall, etc. in the real scene. As the target virtual scene changes, when walking closer to the end of the river (that is, the corridor in the real scene), then a scene picture of the river end (that is, the corridor in the real scene) will be clearer.

Figure 7:
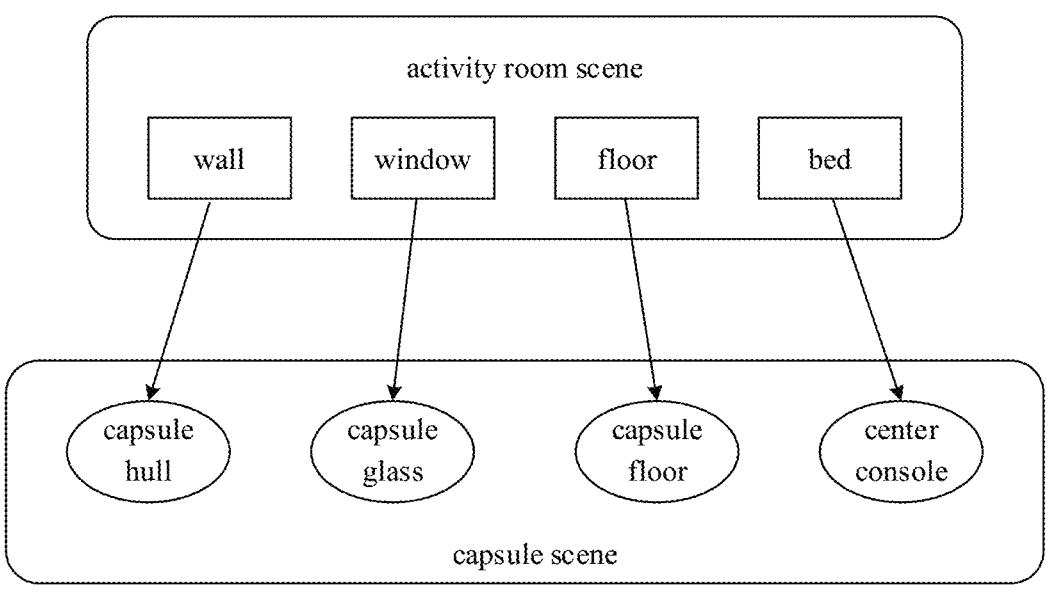
FIG. 7 is another mapping schematic diagram of a virtual object mapped from the entity within a real scene according to an embodiment of the present disclosure.

Take the activity room at the end of the corridor as an example, as shown in FIG. 7, the activity room may generally include the wall, the window, the floor, the bed, etc. The activity room may be mapped into a certain space capsule scene to achieve the diverse interaction when the security area is determined.

Figure 8A:
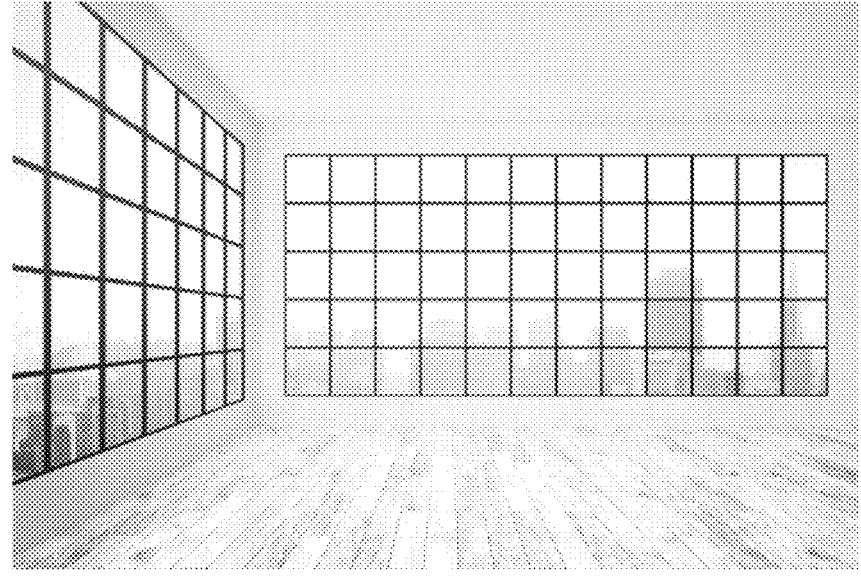

As shown in FIG. 8A and FIG. 8B, the wall in the activity room may be mapped into the capsule hull, the window may be mapped into the capsule glass, the floor may be mapped into the capsule floor, and the bed may be mapped into a center console inside the capsule.

At block S440, the target virtual scene is displayed in the virtual space.

During the user's motion, the property information of each entity within the real scene may be collected in real time, so as to map the real scene into the corresponding target virtual scene, and display the real-time scene picture in this target virtual scene within the virtual space, to ensure the collision-free motion of the user within the real scene and enhance the immersion when the security area is determined.

In the technical solution provided by the embodiment of the present disclosure, after the user wears the XR device, the property information of each entity within the real scene in which the user is in the motion is first determined, and then the target virtual scene mapped from the real scene is displayed in the virtual space based on the property information of the each entity, and then the corresponding security area can be determined based on the security-type virtual object within the target virtual scene, thereby achieving the customized delineation of the security area in a plurality of spatial ranges by using the user's motion in the real scene, and ensuring an adaptability between the security area and the real scene. Moreover, by displaying the target virtual scene mapped from the real scene to the user, the user's collision-free motion in the real scene can be supported before the security area is delineated, thereby enhancing the immersion and the diverse interaction when the security area is determined.

According to one or more embodiments of the present disclosure, for the property information of each entity in the real scene, various entity detection devices configured in the XR device may be used in the present disclosure, to collect relevant entity scene data from various aspects. As shown in FIG. 9, the specific process of determining the property information of each entity in the real scene is described in the present disclosure.

As shown in FIG. 9, the method for determining the property information of each entity in the real scene in the present disclosure may specifically include the following steps.

At block S910, when the user is in the motion, a target image in the real scene, and entity depth data and device pose data that correspond to the target image are obtained.

During the user's motion in the real scene, the XR device may collect the scene image of the point of view of the current motion in real time through the front camera configured in the XR device, so that the front camera can capture each entity in the real scene, and thus obtain the target image in the present disclosure.

Exemplarily, the front camera in the present disclosure may include, but not limited to, an RGB camera, an infrared camera, etc.

In some implementable manners, in order to ensure all-round collection of the entities in the real scene and avoid misidentification of the entities, a plurality of cameras may be configured in the XR device as the corresponding front camera in the present disclosure. Then, images of an entity in the real scene are captured from different angles, and a collection of images taken for the real scene at the same moment is obtained.

Then, during the motion of the user, the collection of images of the real scene taken by the plurality of cameras configured in the XR device at the same moment can be obtained in real time. Then, image fusion is performed on the collection of images at the same moment, so as to describe each entity in the real scene more comprehensively and obtain a corresponding target image.

Furthermore, when collecting the target image in the real scene in real time, the range sensor configured in the XR device will also be configured to detect the relative distance between each entity and the user in the real scene in real time, so as to determine the entity depth data of each entity.

The rang sensor may include, but not limited to, an infrared sensor, a depth camera, and the like.

Moreover, a positioning device, such as inertial sensor, configured in the XR device can collect the device pose data of the XR device in the real scene in real time, so as to represent the absolute position information of the user in the real scene.

The device pose data includes Six Degrees of Freedom (6DOF) data of the HMD and the handle in the XR device and the inertial sensing data detected by an Inertial Measurement Unit (IMU). Accordingly, the pose information of the user in the real scene can be analyzed.

In the present disclosure, according to the collection time of the above-mentioned various types of data, one-to-one correspondence can be performed on the target image, the entity depth data and the device pose data at the same moment, and then the entity depth data and the device pose data corresponding to each target image can be obtained. The target image, the entity depth data and the device pose data at the same moment can be used to analyze the property information of the entity at that moment.

At block S920, recognition is performed on the target image to determine feature information of the entity in the real scene.

Each entity in the real scene may be captured in the target image taken at each moment. Therefore, image recognition is performed on the target image to accurately identify each entity that actually exists in the real scene in the present disclosure. Moreover, the feature information of each entity is extracted to specifically describe the appearance characteristics of the entity, such as size, structure, shape characteristics and the like of the entity.

At block S930, based on the feature information of the entity, the entity depth data and the device pose data, the property information of the entity is determined.

By fusing the feature information and the entity depth data of each entity, the relative position information between each entity and the user can be accurately analyzed. Then, according to the device pose data corresponding to the target image, the absolute position information of the user in the real scene can be determined. Furthermore, by combining the relative position information between each entity and the user, the absolute position information of each entity in the real scene can be determined. Finally, the property information of each entity can be obtained by integrating the feature information, the relative position information and the absolute position information of each entity.

The technical solution provided by the embodiment of the present disclosure uses the various entity detection devices configured in the XR device to collect relevant entity scene data from various aspects, to determine the property information of each entity in the real scene, so as to ensure an accuracy of the property information of each entity.

Figure 10:
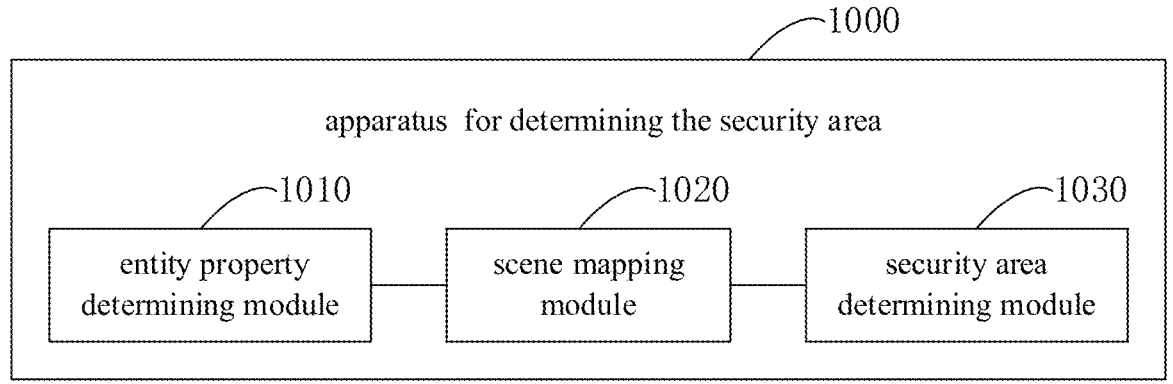
FIG. 10 is a schematic diagram of an apparatus for determining a security area according to an embodiment of the present disclosure.

FIG. 10 is a schematic diagram of an apparatus for determining a security area according to an embodiment of the present disclosure. The apparatus 1000 for determining the security area may be configured in the XR device. The apparatus 1000 for determining the security area may include: an entity property determining module 1010 configured to determine property information of an entity in a real scene in which a user is in a motion; a scene mapping module 1020 configured to display, based on the property information of the entity, in a virtual space a target virtual scene mapped from the real scene; and a security area determining module 1030 configured to determine, based on a security-type virtual object in the target virtual scene, a corresponding security area.

In some implementable manners, the scene mapping module 1020 may be specifically configured to: map, based on the predetermined target mapping relationship and the property information of the entity, the entity into a corresponding virtual object to generate the target virtual scene.

In some implementable manners, the apparatus 1000 for determining the security area may further include: a mapping relationship determining module configured to present corresponding virtual scene options in the virtual space; and obtain, in response to a selection operation on any virtual scene from the virtual scene options, a predetermined target mapping relationship for the selected virtual scene.

In some implementable manners, the entity includes an obstacle entity and a security entity, and the virtual object in the target virtual scene includes an obstacle-type virtual object and the security-type virtual object.

In some implementable manners, the entity property determining module 1010 may include: an entity data obtaining unit configured to obtain, when the user is in the motion, a target image in the real scene, and entity depth data and device pose data that correspond to the target image; an image recognition unit configured to perform recognition on the target image to determine feature information of the entity in the real scene; and an entity property determining unit configured to determine the property information of the entity based on the feature information of the entity, the entity depth data and the device pose data.

In some implementable manners, the entity data obtaining unit may be configured to obtain an image collection of the real scene taken by a plurality of cameras on the XR device at the same moment; and fuse the image collection to generate the target image.

In some implementable manners, the property information of the entity at least includes feature information of the entity, relative position information of the entity, and absolute position information of the entity.

In some implementable manners, the apparatus 1000 for determining the security area may further include: a configuration triggering module configured to access the virtual space; and display, in response to a wake-up instruction in the virtual space, a configuration entry of the security area in the virtual space, to perform a determination operation of the security area.

In the embodiment of the present disclosure, after the user wears the XR device, the property information of each entity within the real scene in which the user is in the motion is first determined, and then the target virtual scene mapped from the real scene is displayed in the virtual space based on the property information of the each entity, and then the corresponding security area can be determined based on the security-type virtual object within the target virtual scene, thereby achieving the customized delineation of the security area in a plurality of spatial ranges by using the user's motion in the real scene, and ensuring an adaptability between the security area and the real scene. Moreover, by displaying the target virtual scene mapped from the real scene to the user, the user's collision-free motion in the real scene can be supported before the security area is delineated, thereby enhancing the immersion and the diverse interaction when the security area is determined.

It should be understood that the apparatus embodiments may correspond to the method embodiments in the present disclosure, and similar descriptions may refer to the method embodiments in present disclosure. To avoid repetition, details are not repeated here.

Specifically, the apparatus 1000 shown in FIG. 10 can execute any method embodiment according to the present disclosure, and the aforementioned and other operations and/or functions of each module in the apparatus 1000 shown in FIG. 10 implement corresponding processes in the above embodiments, and details thereof will not be repeated here for the sake of brevity.

The above-mentioned method embodiments of the present disclosure are described above from the perspectives of the functional modules with reference to the accompanying drawings. It is to be understood that the functional modules may be implemented in the form of hardware, instructions of software, or a combination of the hardware and the software modules. In particular, the steps of the method embodiment of the present disclosure may be performed by the hardware integrated logic circuit and/or instructions in the form of software, and the steps of a method disclosed in connection with the embodiments of the present disclosure may be performed directly by a hardware decoding processor or by a combination of hardware and software modules in a decoding processor. In an example, the software module may be located in the storage medium known in the art, such as, a random access memory, flash memory, read-only memory, programmable read-only memory, electrically erasable programmable memory, registers, or the like. The storage medium is located in a memory, and the processor reads the information from the memory and, in conjunction with its hardware, performs the steps in the above-mentioned method embodiments.

Figure 11:
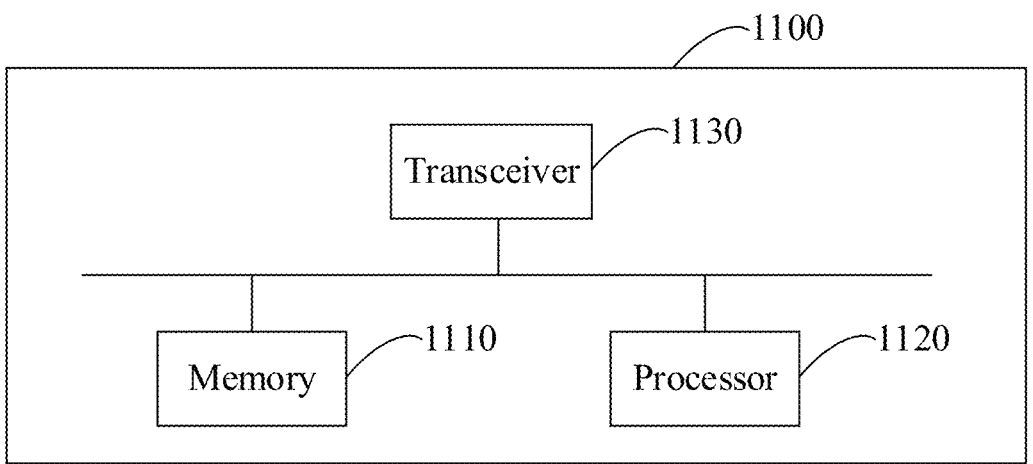
FIG. 11 is a schematic block diagram of an electronic device according to an embodiment of the present disclosure.

FIG. 11 is a schematic block diagram of an electronic device according to an embodiment of the present disclosure.

As shown in FIG. 11, the electronic device 1100 may include a memory 1110 and a processor 1120. The memory 1110 stores a computer program and is configured to transmit the program codes to the processor 1120. In other words, the processor 1120 may be configured to invoke and execute the computer program from the memory 1110 to implement the method in embodiments of the present disclosure.

For example, the processor 1120 may be configured to perform the method embodiments described above based on the instructions on the computer program.

In some embodiments of the present disclosure, the processor 1120 may include, but is not limited to a general purpose processor, a Digital Signal Processor (DSP), an Application Specific Integrated Circuit (ASIC), a Field Programmable Gate Array (FPGA) or other programmable logic device, a discrete gate or transistor logic device, a discrete hardware component, or the like.

In some embodiments of the present disclosure, the memory 1110 includes, but is not limited to a volatile memory and/or a non-volatile memory. The non-volatile memory may be a Read-Only Memory (ROM), a Programmable ROM (PROM), an Erasable PROM (EPROM), an Electrically EPROM (EEPROM), or a flash memory. The volatile memory can be a random access memory (RAM), which acts as external cache memory. By way of illustration and not as limitation, many forms of RAM are available such as Static RAM (SRAM), Dynamic RAM (DRAM), Synchronous DRAM (SDRAM), Double Data Rate SDRAM (DDR SDRAM), Enhanced SDRAM (ESDRAM), synch link DRAM (SLDRAM), and Direct Rambus RAM (DR RAM).

In some embodiments of the present disclosure, the computer program may be divided into one or more modules that are stored on the memory 1110 and executable by the processor 1120 to perform the method according to the present disclosure. One or more modules may be a series of computer program instruction segments capable of performing specific functions, and the instruction segments are used to describe the execution process of the computer program in the electronic device 1100.

As shown in FIG. 11, the electronic device may further include a transceiver 1130. The transceiver 1130 may be connected to the processor 1120 or the memory 1110.

The processor 1120 can be configured to control the transceiver 1130 to communicate with other devices, and more specifically, the processor 1120 can be configured to transmit or receive information or data to or from other devices. The transceiver 1130 may include a transmitter and a receiver. The transceiver 1130 may further include one or more antennas.

It will be appreciated that the various components of the electronic device 1100 are connected by a bus system that includes a power bus, a control bus, and a status signal bus in addition to a data bus.

The present disclosure also provides a computer storage medium having a computer program stored thereon. The computer program, when executed by a computer, causes the computer to perform the method according to the above embodiments.

Embodiments of the present disclosure also provide a computer program product including instructions which, when executed by a computer, cause the computer to perform the methods according to the above embodiments.

When implemented in software, the computer program product may be implemented in whole or in part as a computer program product. The computer program product includes one or more computer instructions. The computer program instructions, when loaded and executed on a computer, result in whole or in part in processes or functions according to embodiments of the present disclosure. The computer may be a general-purpose computer, a special-purpose computer, a computer network, or other programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center by wire (e.g. coaxial cable, optical fiber, digital subscriber line (DSL)) or wirelessly (e.g. infrared, wireless, microwave, etc.). The computer-readable storage medium can be any available medium that the computer can access or a data storage device such as a server or data center that contains one or more available media integrations. The available medium may be a magnetic medium (e.g. floppy disk, hard disk, magnetic tape), an optical medium (e.g. digital video disc (DVD)), or a semiconductor medium (e.g. solid state disk (SSD)), etc.

While the present disclosure has been described with reference to the preferred embodiments thereof, it will be understood by those skilled in the art that various changes or substitutions may be made without departing from the scope of the invention. Therefore, the scope of the present disclosure should be defined by claims.

The invention claimed is:

1. A method for determining a security area, wherein the method is applied in an Extended Reality (XR) device, the method comprising:

determining property information of an entity in a real scene where a user is located;

displaying, based on the property information of the entity, a target virtual scene mapped from the real scene in a virtual space;

determining, based on property information of an entity corresponding to a virtual object in the target virtual scene, a corresponding security area, wherein the method further comprises, prior to said determining the property information of the entity in the real scene where the user is located:

accessing the virtual space; and displaying, in response to a wake-up instruction in the virtual space, a configuration entry of the security area in the virtual space, to perform a determination operation of the security area.

2. The method according to claim 1, wherein said displaying, based on the property information of the entity, the target virtual scene mapped from the real scene in the virtual space comprises:

mapping, based on a predetermined target mapping relationship and the property information of the entity, the entity into a corresponding virtual object to generate the target virtual scene; and displaying the target virtual scene in the virtual space.

3. The method according to claim 2, further comprising:

presenting virtual scene options in the virtual space; and obtaining, in response to a selection operation on any virtual scene from the virtual scene options, a predetermined target mapping relationship for the selected virtual scene.

4. The method according to claim 1, wherein the entity in the real scene comprises an obstacle entity and a security entity, and the virtual object in the target virtual scene comprises an obstacle-type virtual object and a security-type virtual object.

5. The method according to claim 1, wherein said determining the property information of the entity in the real scene where the user is located comprises:

obtaining, when the user is in a motion, a target image in the real scene, and entity depth data and device pose data that correspond to the target image;

performing recognition on the target image to determine feature information of the entity in the real scene; and determining the property information of the entity based on the feature information of the entity, the entity depth data and the device pose data.

6. The method according to claim 5, wherein said obtaining the target image in the real scene comprises:

obtaining an image collection of the real scene taken by a plurality of cameras on the XR device at the same moment; and fusing the image collection to generate the target image.

7. The method according to claim 1, wherein the property information of the entity at least comprises feature information of the entity, relative position information of the entity, and absolute position information of the entity.

8. A electronic device, comprising:

a processor; and a memory storing executable instructions of the processor;

wherein the processor is configured to, when executing the executable instructions, cause the electronic device to:

determine property information of an entity in a real scene where a user is located;

display, based on the property information of the entity, a target virtual scene mapped from the real scene in a virtual space;

determine, based on property information of an entity corresponding to a virtual object in the target virtual scene, a corresponding security area, wherein the executable instructions, when being executed by the processor, further cause the processor to, prior to said determining the property information of the entity in the real scene where the user is located:

access the virtual space; and display, in response to a wake-up instruction in the virtual space, a configuration entry of the security area in the virtual space, to perform a determination operation of the security area.

9. The electronic device according to claim 8, wherein said displaying, based on the property information of the entity, the target virtual scene mapped from the real scene in the virtual space comprises:

mapping, based on a predetermined target mapping relationship and the property information of the entity, the entity into a corresponding virtual object to generate the target virtual scene; and displaying the target virtual scene in the virtual space.

10. The electronic device according to claim 9, wherein the processor is further configured to, when executing the executable instructions, cause the electronic device to:

present virtual scene options in the virtual space; and obtain, in response to a selection operation on any virtual scene from the virtual scene options, a predetermined target mapping relationship for the selected virtual scene.

11. The electronic device according to claim 8, wherein the entity in the real scene comprises an obstacle entity and a security entity, and the virtual object in the target virtual scene comprises an obstacle-type virtual object and a security-type virtual object.

12. The electronic device according to claim 8, wherein said determining the property information of the entity in the real scene where the user is located comprises:

obtaining, when the user is in a motion, a target image in the real scene, and entity depth data and device pose data that correspond to the target image;

performing recognition on the target image to determine feature information of the entity in the real scene; and determining the property information of the entity based on the feature information of the entity, the entity depth data and the device pose data.

13. The electronic device according to claim 12, wherein said obtaining the target image in the real scene comprises:

obtaining an image collection of the real scene taken by a plurality of cameras on the XR device at the same moment; and fusing the image collection to generate the target image.

14. The electronic device according to claim 8, wherein the property information of the entity at least comprises feature information of the entity, relative position information of the entity, and absolute position information of the entity.

15. A non-transitory computer-readable storage medium, having a computer program stored thereon, wherein the computer program, when being executed by a processor, causes the processor to:

determine property information of an entity in a real scene where a user is located;

display, based on the property information of the entity, a target virtual scene mapped from the real scene in a virtual space;

determine, based on property information of an entity corresponding to a virtual object in the target virtual scene, a corresponding security area, wherein the computer program, when being executed by the processor, further causes the processor to, prior to said determining the property information of the entity in the real scene where the user is located:

access the virtual space; and display, in response to a wake-up instruction in the virtual space, a configuration entry of the security area in the virtual space, to perform a determination operation of the security area.

16. The non-transitory computer-readable storage medium according to claim 15, wherein said displaying, based on the property information of the entity, the target virtual scene mapped from the real scene in the virtual space comprises:

mapping, based on a predetermined target mapping relationship and the property information of the entity, the entity into a corresponding virtual object to generate the target virtual scene; and displaying the target virtual scene in the virtual space.

17. The non-transitory computer-readable storage medium according to claim 16, wherein the computer program, when being executed by a processor, further causes the processor to:

present virtual scene options in the virtual space; and obtain, in response to a selection operation on any virtual scene from the virtual scene options, a predetermined target mapping relationship for the selected virtual scene.

18. The non-transitory computer-readable storage medium according to claim 15, wherein the entity in the real scene comprises an obstacle entity and a security entity, and the virtual object in the target virtual scene comprises an obstacle-type virtual object and a security-type virtual object.

\* \* \* \* \*